United States Patent [19]

Greenwood

[11] Patent Number: 4,922,788
[45] Date of Patent: May 8, 1990

[54] CONTINUOUSLY VARIABLE TRANSMISSION

[75] Inventor: Christopher J. Greenwood, Preston, England

[73] Assignee: Torotrak (Development) Ltd, England

[21] Appl. No.: 239,706

[22] Filed: Sep. 2, 1988

[30] Foreign Application Priority Data

Sep. 2, 1987 [GB] United Kingdom ............... 8720639

[51] Int. Cl.$^5$ ............................................. F16H 37/06
[52] U.S. Cl. ...................................... 475/26; 475/28; 475/216
[58] Field of Search ................. 74/690, 691, 681, 682, 74/721, 194, 687, 199; 180/6.7

[56] References Cited

U.S. PATENT DOCUMENTS

| | | | |
|---|---|---|---|
| 1,984,830 | 12/1934 | Higley | 74/686 |
| 2,874,591 | 2/1959 | Thoma | 74/720.5 |
| 3,299,744 | 1/1967 | Kraus | 74/690 X |
| 3,406,597 | 10/1968 | DeBrie Perry et al. | 74/865 |
| 3,739,658 | 6/1973 | Scheiter | 74/691 X |
| 4,286,477 | 9/1981 | Meyerle et al. | 74/687 |
| 4,297,918 | 11/1981 | Perry | 74/690 |
| 4,464,952 | 8/1984 | Stubbs | 74/690 |
| 4,471,669 | 9/1984 | Seaberg | 74/682 X |
| 4,569,251 | 2/1986 | Greenwood | 74/691 |
| 4,628,766 | 12/1986 | de Brie Perry | 74/691 |
| 4,641,548 | 2/1987 | Greenwood | 74/691 |
| 4,718,299 | 1/1988 | Greenwood | 74/691 |

FOREIGN PATENT DOCUMENTS

| | | | |
|---|---|---|---|
| 1234178 | 3/1988 | Canada . | |
| 84724 | 8/1983 | European Pat. Off. | 74/691 |
| 0137264 | 4/1985 | European Pat. Off. . | |
| 0141118 | 5/1985 | European Pat. Off. . | |
| 149892 | 7/1985 | European Pat. Off. | 74/681 |
| 0158411 | 10/1985 | European Pat. Off. . | |
| 177241 | 4/1986 | European Pat. Off. | 74/691 |
| 2925268 | 1/1980 | Fed. Rep. of Germany . | |
| 2954581 | 1/1988 | Fed. Rep. of Germany . | |
| 60-076476 | 4/1985 | Japan . | |
| 60-237245 | 11/1985 | Japan . | |
| 1303616 | 1/1973 | United Kingdom . | |
| 2023753 | 1/1973 | United Kingdom . | |
| 2100372 | 12/1982 | United Kingdom . | |
| 2119328 | 11/1983 | United Kingdom . | |
| 2136893 | 9/1984 | United Kingdom | 74/691 |
| 8501026 | 3/1985 | World Int. Prop. O. . | |

Primary Examiner—Dwight Diehl
Assistant Examiner—Chris Campbell
Attorney, Agent, or Firm—Davis, Bujold & Streck

[57] ABSTRACT

A two-regime CVT for a tracked vehicle steered by differential movement of its tracks, comprising two ratio-varying units of the toroidal-race, rolling-traction type, which drive the vehicle without steer when their outputs are the same, but with steer when those outputs differ. Each such output is connected respectively by way of a steering epicyclic gear set to the drive of one of the tracks. According to one aspect of the invention the axes of the two variators and of the inputs from them to the two steering epicyclics are all coaxial, and may also be coaxial with the input to a third epicyclic gear set operable to change the transmission between its two regimes. Another aspect of the invention resides in a novel arrangement of the components of the two steering epicyclic gear sets in which in the first of the regimes the transmission input directly drives one input of each steering epicyclic, whereas in the second regime the transmission input is disconnected from them, but one of those inputs now becomes an output and drives the other input.

11 Claims, 2 Drawing Sheets

CONTINUOUSLY VARIABLE TRANSMISSION

The present invention relates to a continuously-variable-ratio transmission, which will be referred to as a CVT. It relates especially to CVT's on which the variator, that is to say the ratio-varying component, it is of the toroidal-race, rolling-traction type, and in which the ratio range of the CVT is enhanced by providing it with the facility to operate in more than one "regime".

Multi-regime CVT's of the toroidal-race, rolling-traction type are now well known in the art: three different examples are described and illustrated in patent specifications GB-A-1078791, GB-C-2023753 and US-A-4718299. The typical basic components of a multi-regime CVT are the variator and a gearing sequence consisting of two or more interconnected epicyclic gear sets, the output (or "final drive") of the transmission being provided by one of the components of the final gear set of the sequence. Typically the gearing sequence receives inputs both from the output of the variator and also from the variator input—that is to say, from the prime mover of the vehicle. At least one of the gearing components within the sequence is associated with a clutch or brake, which can either be engaged to hold the component against rotation or released to allow it to rotate. Engaging or releasing such a component or components changes the ratio presented by the gearing sequence as a whole. For each different arrangement of the engagement of the clutch or clutches within the gearing sequence, a progressive change in the setting of the variator from one extreme of its movement to the other will cause the final drive to progress through a different range of speed values, and in the course of progressing through one of those speed ranges the rotation of the final drive also changes direction in some known designs, so that the full ratio range of the CVT enables the vehicle to operate in both forward and reverse drive. It is also well known in the art so to arrange ratios within the variator and gearing sequence that it is possible to change from one clutch arrangement to another—and so from one regime to another—with no instantaneous change of overall ratio. The range of speed values provided by the new regime then follows on smoothly and without a break from that provided by the previous regime. Such a change is known in the art as a "synchronous change".

The invention also applies especially to CVT's which include two variators and which are thus specially suitable for use in a tracked or other vehicle which has first and second laterally-displaced rotary driving members, and which is steered by the differential rotation of those members.

Such a CVT is described in patent specification US-A-4718299, and an object of the present invention is to provide an efficient yet simpler two-variator CVT. The invention is defined by the claims, the disclosure of which is to be read as included within the disclosure of this specification, and the invention will now be described, by way of example, with reference to the accompanying diagrammatic drawings, in which:

Figure 1:
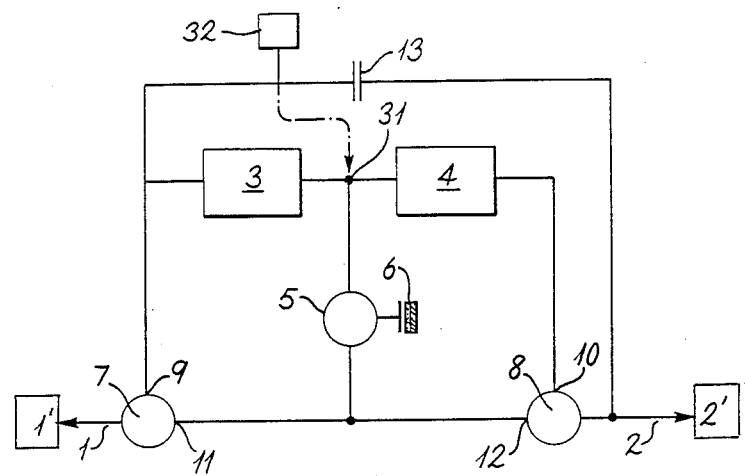
FIG. 1 is a schematic illustration of the operation of a two-regime CVT.

FIG. 1 shows a CVT for a tracked vehicle having an input 31 from a prime mover 32 and outputs 1 and 2 to drive the tracks of the vehicle 1', 2', respectively. The transmission input drives respective inputs of first and second variators 4 and 3 and also one input of an epicyclic gear set 5, referred to elsewhere in this specification as the third epicyclic gear set. A second input of the epicyclic 5 is connected to a brake 6 operable to engage Low Regime, that is to say a first of the two regimes. The output 14 of the variator 3 is connected to an input 9 of an epicyclic gear set 7, referred to elsewhere in this specification as the second epicyclic gear set, and is also connectable by a clutch 13 directly to the opposite one of the outputs of the transmission (2). The output 15 of the variator 4 is connected to a first input 10 of an epicyclic gear set 8, referred to elsewhere in this specification as the first epicyclic gear set. Second inputs 11, 12 of the epicyclics 7 and 8 are connected to each other and to the output of the epicyclic 5.

In operation, in low regime, the clutch 13 is disengaged and the brake 6 is engaged. When an input is applied to the transmission at 31 the variators 3 and 4 will drive the first inputs 9 and 10 of the epicyclics 7 and 8 respectively. Because the brake 6 is engaged the epicyclic 5 will drive the second inputs 11 and 12 of the epicyclics 7 and 8. These epicyclics will therefore drive their respective outputs 1 and 2, and it will therefore be seen that in low regime the speeds of outputs 1 and 2 will be dependent upon the output speeds of their related variators 3 and 4.

In high regime the brake 6 is disengaged and the clutch 13 engaged. Thus variator 3 now drives output 2 directly. It also continues to drive input 9 of epicyclic 7. Meanwhile variator 4 also continues to drive input 10 of epicyclic 8. It will be seen, however, that epicyclic 8 is now effectively receiving inputs both from input 10 and also from the transmission output 2. Thus it will itself generate an output at 12, driving the input 11 of the epicyclic 7 independently of input 31 because brake 6 is disengaged. Thus epicyclic 7 is now receiving two inputs and will generate an output at 1, driving the associated track as required. In high regime the speed of output 2 will be dependent on the speed of variator 3 while the speed of output 1 will be dependent on the speeds of both of the variators.

Figure 2:
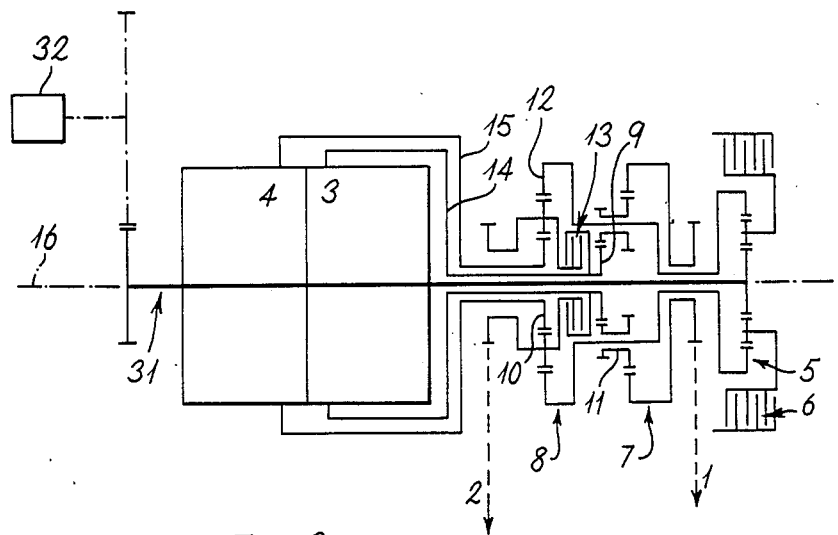
FIG. 2 shows an arrangement of epicyclic gear sets in such a CVT.

FIG. 2 shows a layout of epicyclic gear sets which achieves the transmission arrangement of FIG. 1. In FIG. 2 the same numerals are used to denote the same integers as in FIG. 1. In this FIGURE the variators 3 and 4 are shown as being mounted with their input and output axes all coaxial (16). This can be achieved by the use of variators of the toroidal-race, rolling traction type. As is already customary with variators of this type, the outputs of variators 4, 3 are connected to the inputs 10, 9 of epicyclic gear sets 8, 7 by bell-shaped members 15, 14 which are coaxial with the variators themselves.

Figure 3:
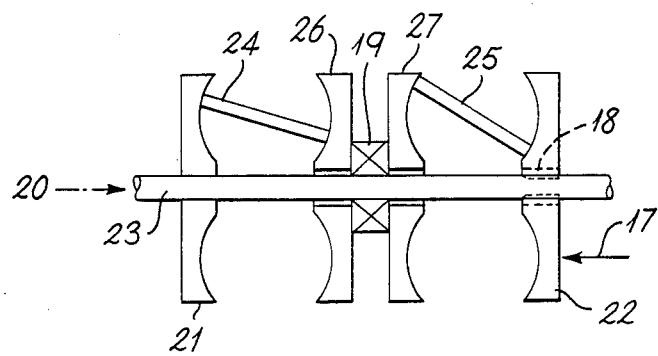
FIG. 3 shows a novel variator unit for use in such a CVT.

FIG. 3 shows a novel combination of such variators, suitable for use with the transmission of the preent invention. Transmission input 20 drives first and second opposing input discs 21, 22 connected to be driven together by a shaft 23. Sets of rollers 24, 25 transmit drive to first and second output discs 26 and 27. Unlike the input discs and unlike the corresponding components in known toroidal-race variators, the two output discs are not connected to be driven together but are separated by a thrust bearing 19 able to rotate one at a different speed to the other. The speed of each disc may be varied independently of the other by varying the angle of the relevant set of rollers. In this way coaxial input and first and second outputs can be achieved. It should be noted that while input disc 21 is fixed to shaft 23, there is a keyed connection 18 between the shaft and disc 22 so that the two parts always rotate together but are capable of limited relative movement axially in response to an end load which creates the appropriate contacting forces between the discs and the rollers. The magnitude of the end load and the appropriate means to generate it are well understood in the art, and the means are indicated schematically at 17.

Figure 4:
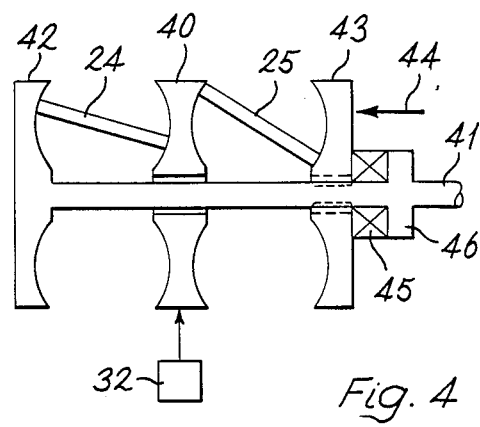
FIG. 4 shows an alternative to the unit of FIG. 3.

In the alternative toroidal race variator of FIG. 4 a single input disc 40 is driven by the same transmission input 20 and rotates with clearance about an output shaft 41 to which a first output disc 42 is fixed and a second output disc 43 is keyed so that it has limited freedom of axial movement relative to the shaft, and end load is applied at 44. A thrust bearing 45 separates disc 43 from a shoulder 46 on shaft 41.

The invention thus provides a CVT in which steering is effected by differential setting of the two variators 4 and 3, and in which epicyclic gear sets 8 and 7 may therefore be considered as "steering" epicyclics, and the third gear set 5 as the "regime change" epicyclic. Potential advantages of the CVT include great economy in the number of components used, compactness and neatness inherent in the coincidence of the operating axes of the variators 4, 3 and epicyclics 8, 7 and 5 as shown in FIG. 2, identical stear performance in high and low regimes, and no problem for the engineer skilled in the art to choose ratio ranges for variators 4 and 3, and epicyclic ratios for gear sets 8 and 7, so as to permit synchronous change between high and low regimes.

Numerical values for one design of CVT according to the invention will now be stated and discussed with reference to the variator shown in FIG. 3 of the drawings. If in that figure the speeds of rotation of input shaft 23, output disc 26 and output disc 27 are $N_1$, $N_2$ and $N_3$ respectively, then for a value of $N_1$ equal 1000 rpm, the CVT was designed so that the quantity $(N_2+N_3)/2$ ranged in value between $-500$ rpm to $-2000$ rpm, and the value of the function $(N_2-N_3)/2$ lay between $+200$ rpm at maximum stear to one hand, and $-200$ rpm at the opposite steering extreme. The thrust bearing 19 therefore perceives only a maximum relative speed of 400 rpm between the discs 26, 27 to either side of it: such a difference requires a bearing of only modest size compared with other thrust bearings known in this art. In summary, the above figures indicate a variator with a propulsion range of from $-0.5$ to $-2.0$, and a total ratio range (allowing for the fact that full steer may be added to full propulsion) of from $-0.3$ to $-2.2$. Maximum reverse speed can be as much as 50% of maximum foward speed, and at full steer track speed difference (i.e. variator 4 at one extreme ratio setting, and variator 3 at the opposite extreme) a forward speed equal to 20% of the maximum forward speed is still possible.

I claim:
1. A continuously-variable-ratio transmission capable of operation in at least first and second regimes, and adapted for use in a vehicle having first and second laterally-displaced rotary driving members and steered by differential rotation of such members, comprising:
first and second ratio-varying units having first and second rotary output members rotatable about first and second output axes, respectively;
associated first and second epicyclic gear sets each having first and second input axes by which said first and second epicyclic gear sets are connected to said first and second rotary output members, respectively, and each epicyclic gear set having three components, namely one each of sun, carrier and annulus components, one of said three components of each of said first and second epicyclic gear sets being connected, respectively, to said first and second driving members; and in which said first and second input axes of said epicyclic gear sets and said first and second output axes of said first and second ratio-varying units all coincide.

2. A continuously-variable-ratio transmission capable of operation in at least first and second regimes, and adapted for use in a vehicle having first and second laterally-displaced rotary driving members and steered by differential rotation of such members, comprising:
first and second ratio-varying units having first and second rotary output members rotatable about first and second output axes, respectively;
associated first and second epicyclic gear sets each having first and second input axes by which said first and second epicyclic gear sets are connected to said first and second rotary output members, respectively, and each epicyclic gear sets having three components, namely one each of sun, carrier and annulus components, a first one of said three components of said first and second epicyclic gear sets being connected respectively to first and second driving members;
a mechanism for changing between said regimes, in which said mechanism comprises a gear combination presenting a third input axis; and in which said first and second input axes of said epicyclic gear sets, said third input axis of said mechanism, and said first and second output axes of said first and second ratio-varying units all coincide.

3. A transmission according to claim 2 in which said first and second ratio-varying units share a common input and in which said ratio-varying units and gear sets are arranged so that a second of said three components of each of said first and second epicyclic gear sets is respectively and permanently connected to said rotary output members of the said associated first and second ratio-varying units, in which in said first regime the third said three components of each of said epicyclic gear sets is connected to said common input, and in which in said second regime said rotary output member of said second ratio-varying unit is connected directly to said first rotary driving member and so also to said first component of said first epicyclic gear set, and said first component of said first epicyclic gear set and said second component of said second epicyclic gear set are connected so that they rotate together.

4. A transmission according to claim 2 in which said ratio-varying units are of toroidal-race rolling-traction type, and in which said ratio-varying units have respective input axes which coincide with said other axes.

5. A transmission according to claim 4 in which each said ratio-varying unit has at least one input disc and at least one output disc, and includes a rotary thrust bearing, and in which said input discs of said two ratio-varying units are fixed relative to each other, and in which said output discs are capable of relative rotation and bear against each other by way of said rotary thrust bearing.

6. A transmission according to claim 5 in which said two ratio-varying units each comprise a single said input disc and output disc and are combined into a single composite unit including a common input shaft, in which said input discs are mounted on said common input shaft and are located at opposite ends of said unit and face axially-inwards relative to said shaft, and said two output discs are located axially-centrally within said unit, face axially-outwards towards their respective said input discs, and are separated by said rotary thrust bearing.

7. A transmission according to claim 4 in which said two ratio-varying units each comprise a single a output disc and are combined into a single composite unit including a central shaft, in which a single input disc presents first and second opposite faces, in which an input toroidal race for said first ratio-varying unit is formed on said first face and an input toroidal race for said second ratio-varying unit is formed on said second face, in which said input disc lies axially-centrally within said unit, and in which said output discs are mounted at opposite axial ends of said unit and are connected by way of a central shaft and rotary thrust bearing.

8. A continuously-variable-ratio transmission capable of operation in at least first and second regimes, and adapted for use in a vehicle having first and second laterally-displaced rotary driven members and steered by differential rotation of such members, comprising:

a transmission input adapted to be driven by a prime mover of the vehicle;

first and second ratio-varying units each having an input connected to said transmission input, and an output;

first and second epicyclic gear sets each having three components, namely one each of sun, carrier and annulus components; whereby in said first regime a third and a second of said three components of said first epicyclic gear set are driven by way of said transmission input and by said output of said first ratio-varying unit, respectively, to provide drive for said first driven member from a first component of said first epicyclic gear set, and a third and a second of said three components of said second epicyclic gear set are driven by way of said transmission input and by said output of said second ratio-varying unit, respectively, to provide drive for said second driven member from a first said component of said second epicyclic gear set; and in said second regime said output of said second ratio-varying unit drives said first said component of said first epicyclic gear set directly and so drives said first driven member, said output of said first ratio-varying unit drives said second said component of said first epicyclic gear set, and said third said component of said first epicyclic gear set and said output of said second ratio-varying unit drive, respectively, drive said third and said second said components of said second epicyclic gear set and so provide drive to said second driven member by way of the said first said component of said second epicyclic gear set.

9. A transmission according to claim 8 including a third epicyclic gear set having three components, namely sun, carrier and annulus components, in which a brake is associated with one of said three said components of said third epicyclic gear set, and in which operation of said brake drivingly connects said transmission input with said first and second epicyclic gear sets in said first regime in a manner by-passing the outputs of the said first and second ratio-varying units.

10. A transmission according to claim 8 including a clutch operable to engage said output of said second ratio-varying unit with said first said component of said first epicyclic gear set in said second regime.

11. A transmission according to claim 8 in which said first and second ratio-varying units are of toroidal-race, rolling traction type and are coaxial.

* * * * *

UNITED STATES PATENT AND TRADEMARK OFFICE
CERTIFICATE OF CORRECTION

PATENT NO. : 4,922,788

DATED : May 8, 1990

INVENTOR(S) : Christopher John GREENWOOD

It is certified that error appears in the above-identified patent and that said Letters Patent is hereby corrected as shown below:

Column 4, line 48, insert --of-- after "third"; and

Column 6, line 19, delete "drive".

Signed and Sealed this

Seventeenth Day of March, 1992

*Attest:*

HARRY F. MANBECK, JR.

*Attesting Officer*      *Commissioner of Patents and Trademarks*